United States Patent [19]
Iles

[11] Patent Number: 5,511,926
[45] Date of Patent: Apr. 30, 1996

[54] MOVEMENT OF AIRCRAFT

[76] Inventor: Frank Iles, Loscombe Farm, Loscombe Lane, Four Lanes, Redruth, Cornwall, Great Britain

[21] Appl. No.: 284,418

[22] PCT Filed: Feb. 3, 1992

[86] PCT No.: PCT/GB92/00195

§ 371 Date: Aug. 2, 1994

§ 102(e) Date: Aug. 2, 1994

[87] PCT Pub. No.: WO93/14972

PCT Pub. Date: Aug. 5, 1993

[51] Int. Cl.⁶ .................................................. B64F 1/22
[52] U.S. Cl. ........................... 414/428; 414/426; 180/904
[58] Field of Search .................................. 414/426–430, 414/471, 474, 476; 280/47.23, 47.24; 244/50; 180/904

[56] References Cited

U.S. PATENT DOCUMENTS

| | | | |
|---|---|---|---|
| 2,798,729 | 7/1957 | Paul | 180/904 X |
| 3,009,711 | 11/1961 | White | |
| 3,049,253 | 8/1962 | Cabral | 414/428 |
| 3,662,911 | 5/1972 | Harman | |
| 3,946,886 | 3/1976 | Robinson | 414/430 |
| 4,036,384 | 7/1977 | Johnson | 414/430 |
| 4,130,210 | 12/1978 | Purviance | 414/428 |
| 5,302,074 | 4/1994 | Elfström | 414/426 X |
| 5,308,212 | 5/1994 | Pollner et al. | 414/428 |
| 5,314,287 | 5/1994 | Wichert | 414/427 |

FOREIGN PATENT DOCUMENTS

| | | | |
|---|---|---|---|
| 0331363 | 9/1989 | European Pat. Off. | 414/426 |
| 3732645 | 9/1988 | Germany | 414/430 |
| 1105364 | 3/1968 | United Kingdom. | |
| 2248215 | 4/1992 | United Kingdom. | |
| 8908583 | 9/1989 | WIPO | 414/426 |

*Primary Examiner*—James W. Keenan
*Attorney, Agent, or Firm*—Larson and Taylor

[57] ABSTRACT

A self-propelled dolly for the movement of aircraft. The dolly includes a pair of laterally spaced apart first ground-engaging wheels. Each wheel is mounted about a portion of a split first axle mounted in a corresponding pair of spaced apart parallel members of a bifurcated chassis portion. The dolly also includes one or more second ground-engaging wheels that are mounted on a second chassis portion pivotally connected to the bifurcated chassis portion about a substantially vertical axis. The second ground-engaging wheels provide steering ability to the dolly and a handle extending from the second chassis portion permits an operator to control the dolly. A motor and drive train is operatively connected to at least one of the ground-engaging wheels. The bifurcated chassis portion is formed in two sections pivotally connected together about a lateral pivot axis at an intermediate location between the first and second wheels. The sections are lowerable and raisable with respect to the ground at their mutually connected ends. A wheel support is mounted on one of the sections and includes a releasable locking mechanism to maintain the sections in the raised position, in which an aircraft with a wheel thereof supported about ground level by the dolly may be manoeuvred.

8 Claims, 8 Drawing Sheets

MOVEMENT OF AIRCRAFT

FIELD OF THE INVENTION

This invention relates to the ground movement of aircraft or of automobiles, heavy trailers and the like.

BACKGROUND OF THE INVENTION

The movement of aircraft, especially light aircraft, presents difficulties particularly for individuals and particularly in confined areas such as an aircraft hangar or parking area. Not only is the weight considerable but there is the problem of manouevring while avoiding other aircraft, walls, doors and so on. Larger aircraft, on the other hand, are generally moved by means of purpose-built towing tractors which have sufficient weight to afford enough traction to pull or push large loads without wheel-slip. Such tractors, even small ones, are impractical for light aircraft and a small tractor would have insufficient weight to avoid wheel-slip when exerting the required tractive force.

It is an object of the present invention to provide a self-propelled device for the ground movement of for example light aircraft, on a hard or grass surface, which avoids the disadvantages referred to above.

SUMMARY OF THE INVENTION

According to the invention, a self-propelled dolly for the movement of aircraft comprises a chassis supported by wheel means carried on two longitudinally-spaced axles, the chassis including aircraft wheel support means between the axles, the wheel support means being movable between a lowered position for engagement and disengagement of an aircraft wheel and a raised position for supporting the aircraft wheel above the ground surface, at least one wheel means being motor-drivable.

In the use of a dolly according to the invention, the weight of the aircraft (or other load) provides the downward-acting force which enables sufficient friction to be developed between the driven wheel means and the ground to avoid wheel-slip.

Preferably, the wheel means are circular and equipped with pneumatic tyres although tracked wheels could be used on at least one axle. Desirably, the dolly is steerable, for example by constructing and arranging for one axle to be pivotable about a vertical axis with respect to the other axle.

The chassis may be constructed in two parts pivoted together about a horizontal axis between the axles and including releasable locking means to maintain the wheel support means, which is preferably integral with one part of the chassis, in the raised or load-carrying position except when required to be lowered for engagement and disengagement of an aircraft wheel, which will generally be a nose-wheel but may, depending on the wheel configuration of the aircraft, be a tail-wheel.

In a preferred arrangement, a dolly according to the invention comprises:

a pair of laterally spaced apart first ground-engaging wheels each mounted about a portion of a split first axle mounted in respective parallel members of a bifurcated chassis portion, the members defining therebetween a space to receive an aircraft wheel; one or more second ground-engaging wheels mounted on a second chassis portion pivotably connected to the bifurcated chassis portion about a substantially vertical axis to provide steering ability to the dolly, the second chassis portion including handle means extending therefrom for control of the dolly by an operator; and a motor and drive means operatively connected to at least one of said ground-engaging wheels; the bifurcated chassis portion being formed in two sections pivotably connected together about a lateral pivot axis at an intermediate location between said first and second wheels, whereby said sections are lowerable and raisable at their mutually connected ends with respect to the ground, means to support an aircraft wheel being mounted on one of said sections and including releasable locking means to maintain said sections in the raised position, in which an aircraft with a wheel thereof supported above ground level by the dolly may be manoeuvred.

Preferably, the bifurcated chassis portion includes load-bearing elements which are disposed inboard of the parallel members, and the support means comprises fixed and movable wheel cradles which may be mounted or mountable between the load-bearing elements and/or the parallel members of the bifurcated chassis portion, whereby the bifurcated chassis portion members may be placed on either side of an aircraft wheel with the wheel in contact with the fixed cradle, and the movable cradle may then be located so that the wheel is evenly supported about its central bearing on raising the sections of the bifurcated portion from the engagement/disengagement to the load-carrying position.

The load-bearing elements of the bifurcated chassis portion preferably comprise forwardly-extending arms between which an aircraft wheel may be located, and the movable cradle is preferably engageable on the arms at any position therealong to accommodate wheels of various diameters. The cradle is preferably lockable on the arms by the weight of the aircraft. For example, the movable cradle may comprise sleeve members which are slidable along the arms and are connected together by a lateral member carrying chock means, the sleeve members including upper and lower pins or dowels between which the arms are passed, whereby in the unloaded condition the sleeves may readily be slid along the arms until the chock means is adjacent the aircraft wheel but in the loaded condition the weight of the aircraft acting on the chock means causes the sleeve members to become firmly engaged on the arms. One way of achieving this is for the construction and arrangement of the chock means to be such that it is disposed rearwardly of the lateral member, whereby downward force on the chock means imparts a turning moment to the lateral member which thus causes the upper and lower dowels of the sleeve members to grip the arms firmly between them.

The releasable locking means may comprise bracing elements which extend between the respective sections of the bifurcated chassis portion. Preferably, one of said sections comprises substantially horizontal members (generally constituted by the parallel members which carry the first axle) and the other of said sections carries upstanding members, the lateral pivot axis between the sections being located at the rear ends of the horizontal members and the lower ends of the upstanding members, and the bracing elements forming a triangular bracing structure between them. Conveniently, the load-bearing arms already referred to also constitute the bracing elements, the arms being pivotably connected at their upper or rearward ends to the upper ends of the upstanding members and carried at their lower or forward ends by pins, spigots or other bearing means attached to the horizontal members. A pawl and ratchet or other mechanical locking means is provided at the pivotal position to engage automatically when the sections of the bifurcated chassis portion are in the raised position, to prevent return to the lowered position until the pawl and ratchet are disengaged. As an alternative to the bracing elements, a hydraulic piston and cylinder may be mounted between the respective sections to control raising and lowering thereof.

BRIEF DESCRIPTION OF THE DRAWINGS

Embodiments of the invention will now be described by way of example with reference to the accompanying drawings, of which

DESCRIPTION OF THE PREFERRED EMBODIMENTS

Figure 1:
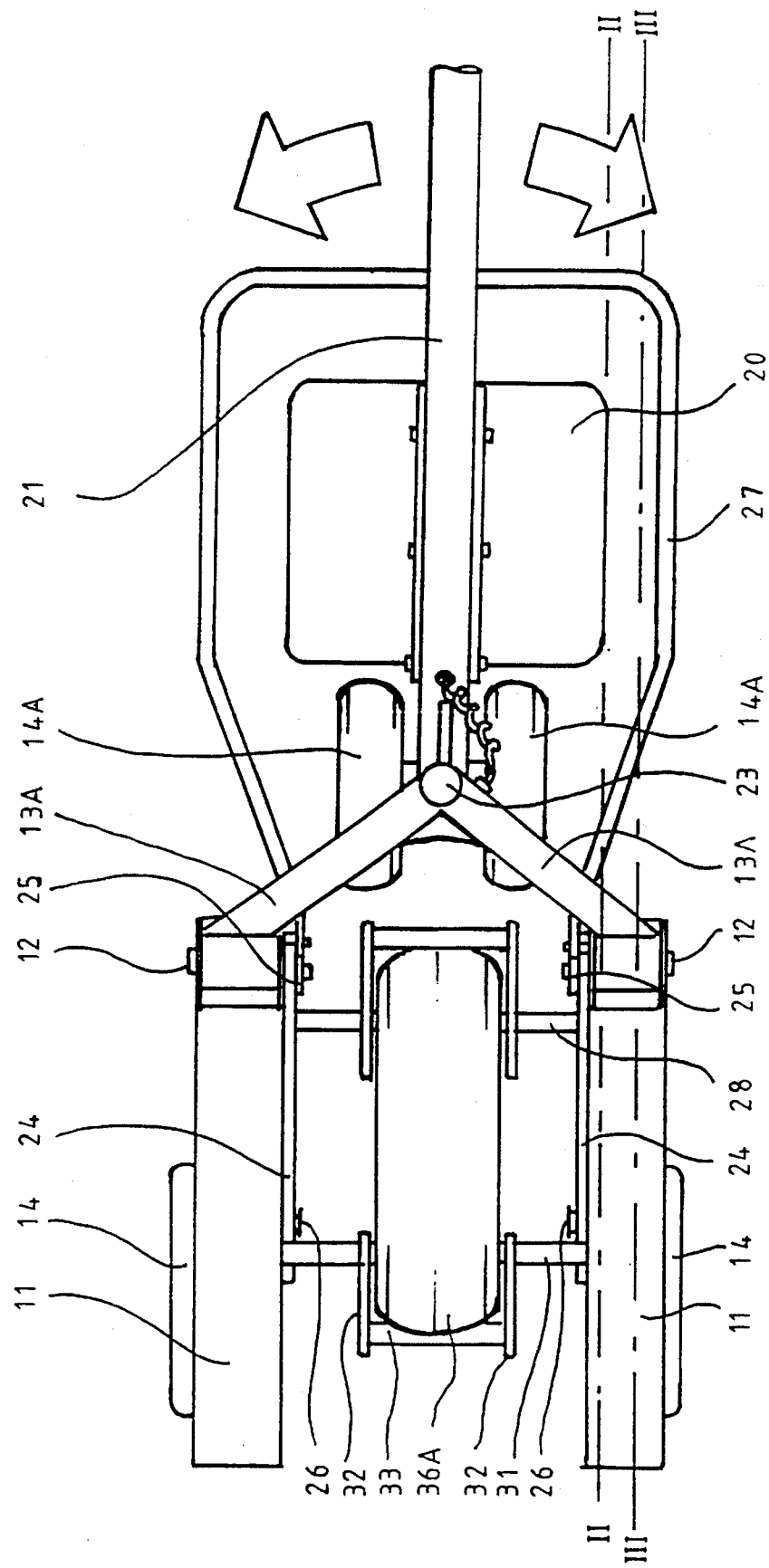
FIG. 1 is a plan view of an inventive dolly with an aircraft wheel in position.
Figure 4:
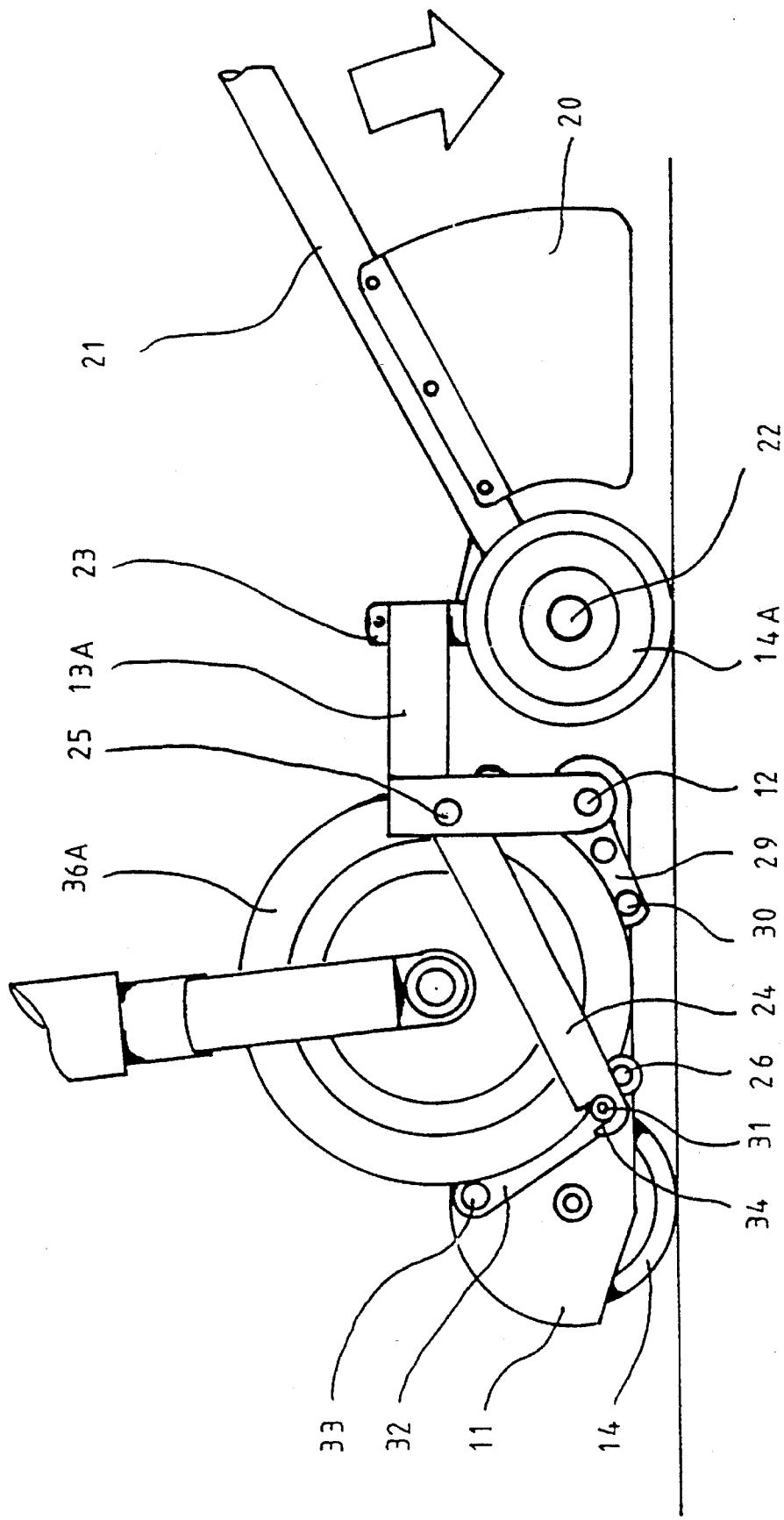
FIG. 4 is a similar view to FIG. 3, in the load-carrying position.
Figure 5A:
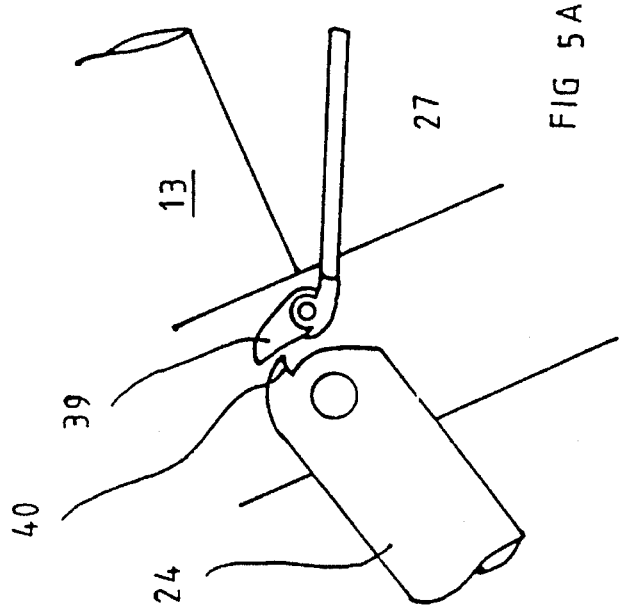
FIGS. 5(a) and (b) show a detail of a pawl and ratchet releasable locking mechanism.
Figure 5B:
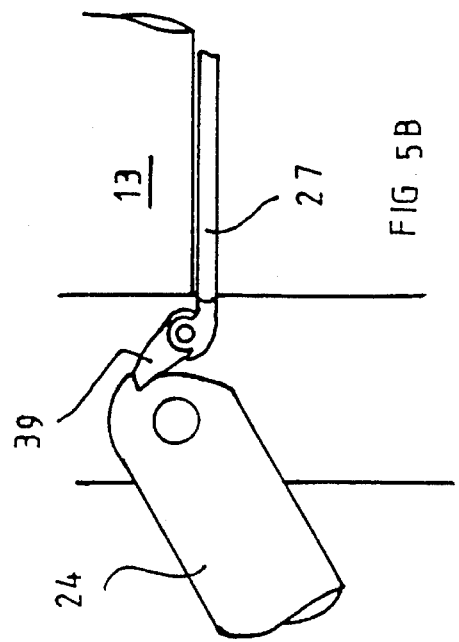
Figure 6:
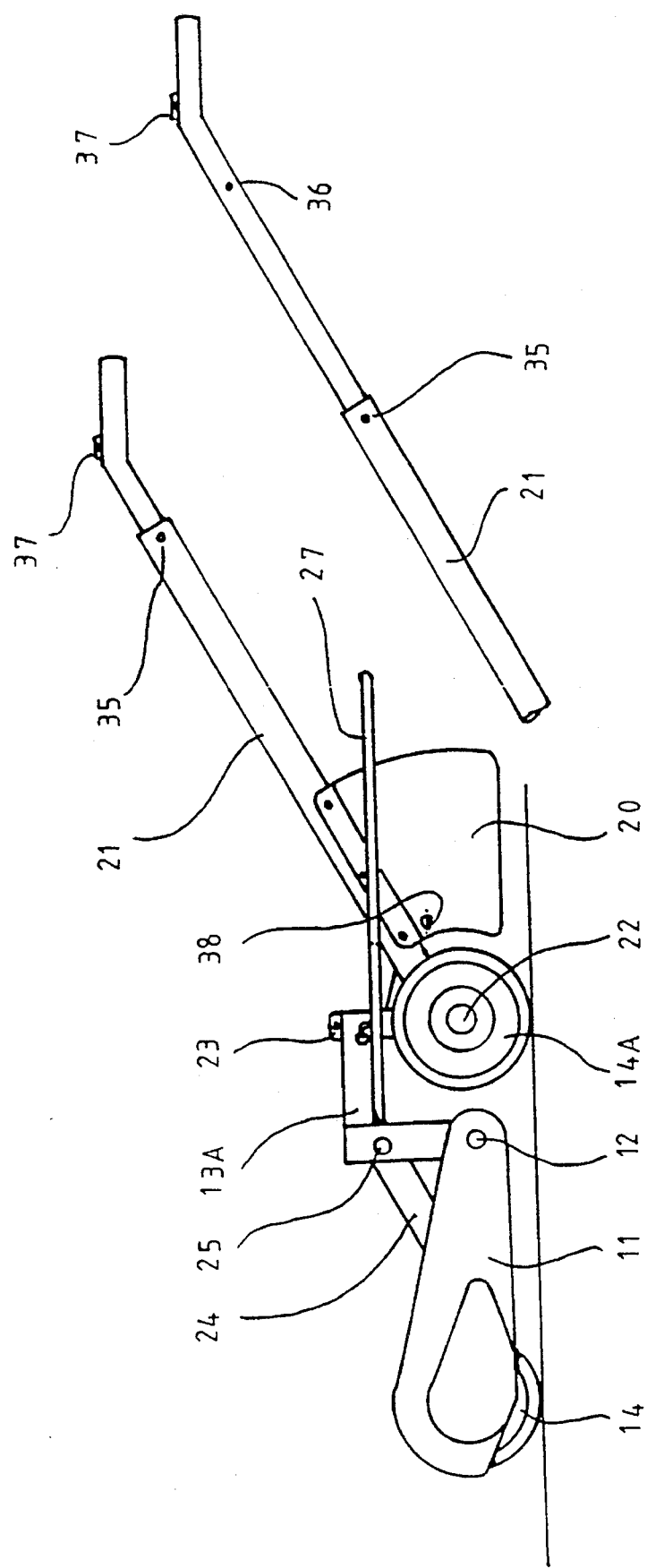
FIG. 6 shows a general side view of the dolly.

Referring to FIG. 1, the dolly includes a bifurcated chassis portion including horizontal side members 11 which are pivotably connected at 12 (see also FIG. 2) to upstanding members 13 connected together at their upper ends by "V" members 13A. The side members 11 carry road wheels 14; these are driven by an electric motor 15 via a sprocket 16, chain 17 and sprocket 18. The electric motor is powered by a battery 19, which may be rechargeable via a battery charger and power supply socket 38 (FIG. 6). The battery is located within the housing 20 of a second chassis portion and supported by handle 21 which is attached to the casing of axle 22 carrying road wheels 14A; the second chassis portion is pivotably attached about a vertical axis at 23 to the members 13/13A, suitable stop means (not shown) being included to restrict the allowable extent of movement. Longitudinal bracing/wheel support arms 24 are pivotably attached at 25 to the upper ends of members 13; the other ends of the arms 24 are supported by rollers 26 (see also FIGS. 3 and 4) attached to horizontal members 11 and on which the members 24 can slide. A pawl and ratchet arrangement (see FIG. 5) and a release bar 27 (FIG. 6) are associated with pivotable attachment point 25.

The horizontal side members 11 carry a cross member 28 which includes an aircraft wheel cradle consisting of side plates 29 and lateral tyre-support elements 30. A similar cradle consisting of cross member 31, side plates 32 and lateral tyre-support elements 33 is removably mountable between the bracing/wheel support members 24, in notches 34 formed therein.

Figure 7:
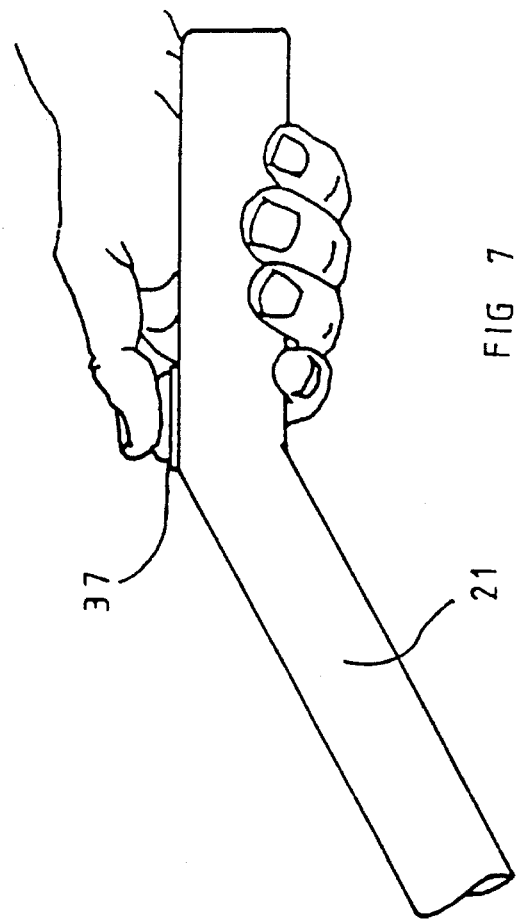
FIG. 7 shows a detail of the control handle.

The handle 21 is extendable (see FIG. 6) for height- and leverage-adjustment and is securable in the retracted or extended position by means of a pin which is insertable when hole 35 formed in the outer sleeve portion is in registration with hole 36 or, for the extended position, a like similar hole (not visible in the drawings). A forward/reverse switch 37 is carried by the handle at the hand-grip (FIG. 7).

Figure 2:
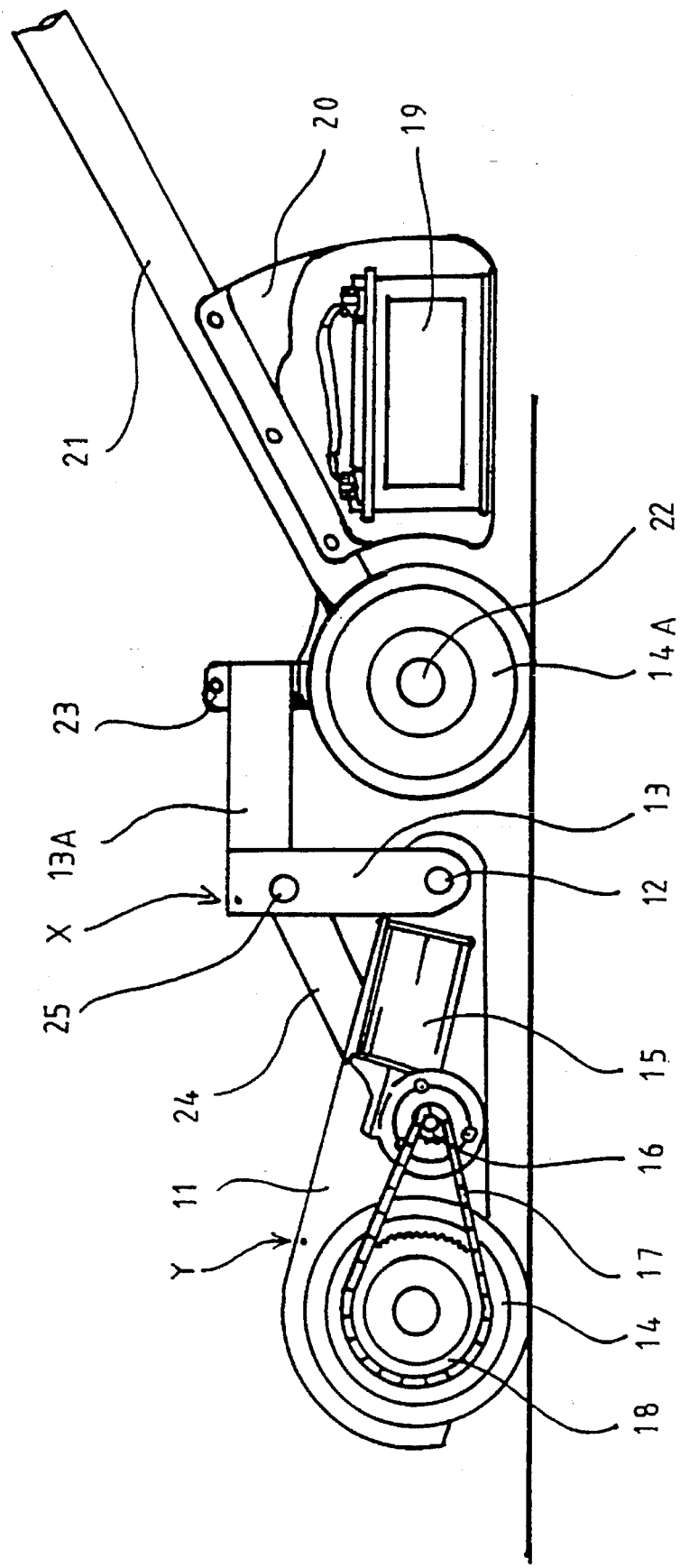
FIG. 2 is a partly cut-away side view of the dolly in the unloaded condition on the line II—II of FIG. 1.
Figure 3:
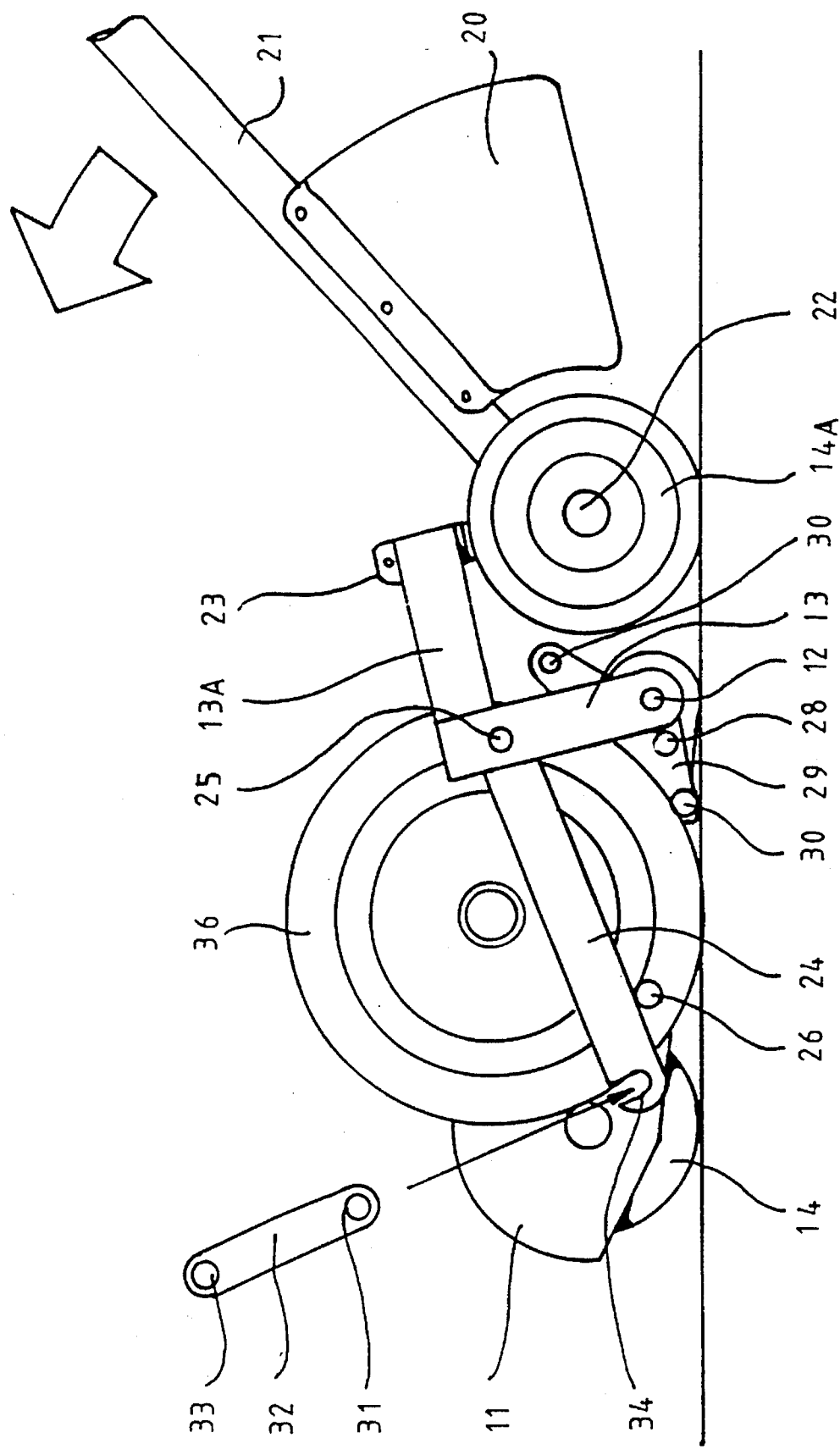
FIG. 3 is another partly cut-away side view of the dolly, along the line III—III of FIG. 1, in the wheel-engaging position.

In use and in order to prepare the dolly for use from the FIG. 2 position to the FIG. 3 position, the dolly is placed so that the horizontal side members 11 and the support members 24 are disposed on either side of an aircraft wheel 36A. A downwards pressure is then exerted on the handle 21 and/or the release bar 27 which has the effect of releasing the pawl 39 from engagement with the notch 40 of the ratchet (FIG. 5a), thereby allowing the handle to be raised so that the chassis sections tilt about their wheel axles and about axis 12 to attain the FIG. 3 position. The dolly is then moved so that the wheel is received in the fixed cradle between the side plates 29 and the removable cradle is placed in position, whereby the tyre is supported fore and aft of the wheel axle. The handle may then be lowered (FIG. 4) to raise the chassis portions and to cause the pawl, which is spring-loaded, automatically to re-engage the ratchet, (FIG. 5b) whereby the members 11, 13 and 24 form a triangle the geometry of which is held rigid, thereby locking the dolly in the load-carrying position. The dolly is then movable by its electric motor, using the weight of the aircraft for traction, and is manually steerable from the handle 21. The aircraft wheel may be released by repeating the FIGS. 2–3 procedure as explained above.

The dolly may be adapted to any size or width of wheel or for various wheel configurations.

The pawl and ratchet mechanism may be replaced, for example, by a hydraulic ram acting between points X and Y (FIG. 2).

Figure 8:
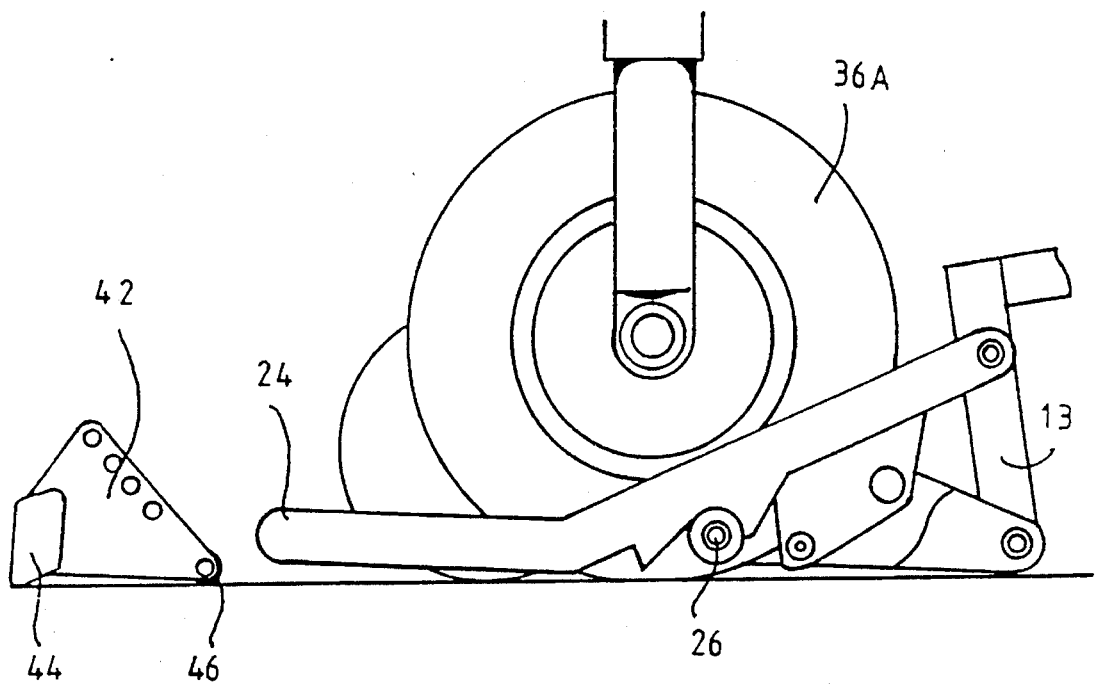
FIGS. 8 to 11 are fragmentary views showing an alternative wheel-retaining arrangement.

FIG. 8 shows a cut-away side view of the machine in the folded or lowered position with an aircraft nosewheel in place, and a removable wheel cradle or chock ready to be located on wheel support arms 24. The wheel cradle includes a small roller 46, for ease of movement, and at rest is supported between the roller and the heel of the plates 44. It will be noted that wheel support arms 24 are longer and are without the notches 34 shown in FIGS. 3 and 4.

The removable wheel cradle or chock consists of cross member 41 (FIG. 11), side plates 42, lateral tyre support element 43, and sleeves at each end of the cross member 41, the sleeves consisting of plates 44 and upper and lower plate-connecting dowels 45. The sleeves are slidably adjustable on support arms 24 so as to accommodate various nosewheel diameters. The plates 42 are mounted so that they are offset rearwardly in relation to the cross member 41.

Figure 9:
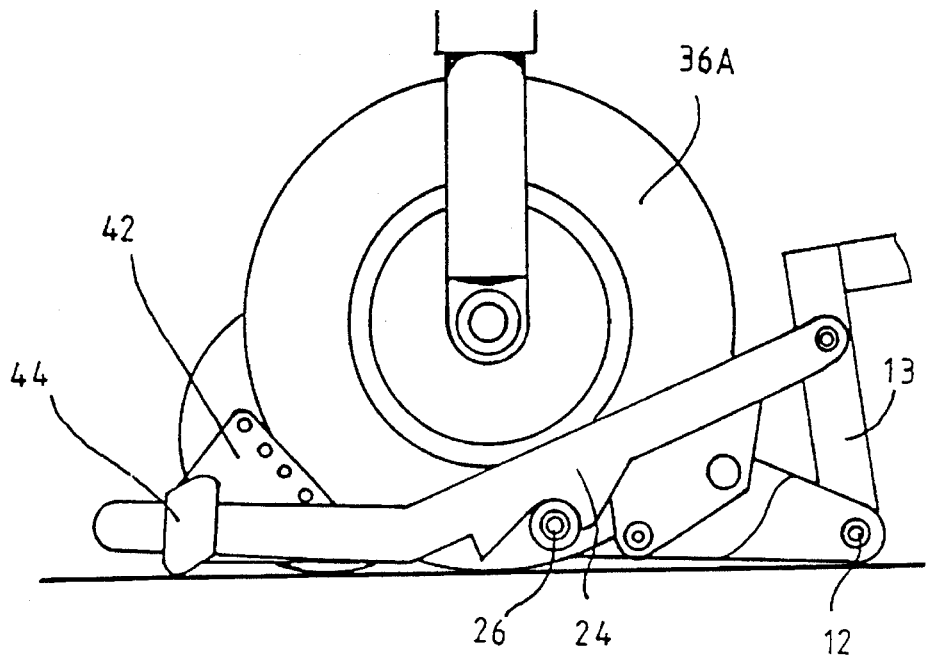

FIG. 9 shows a cut-away side view of the machine with the removable wheel cradle located on wheel support arms 24, and in position against the nosewheel.

Figure 10:
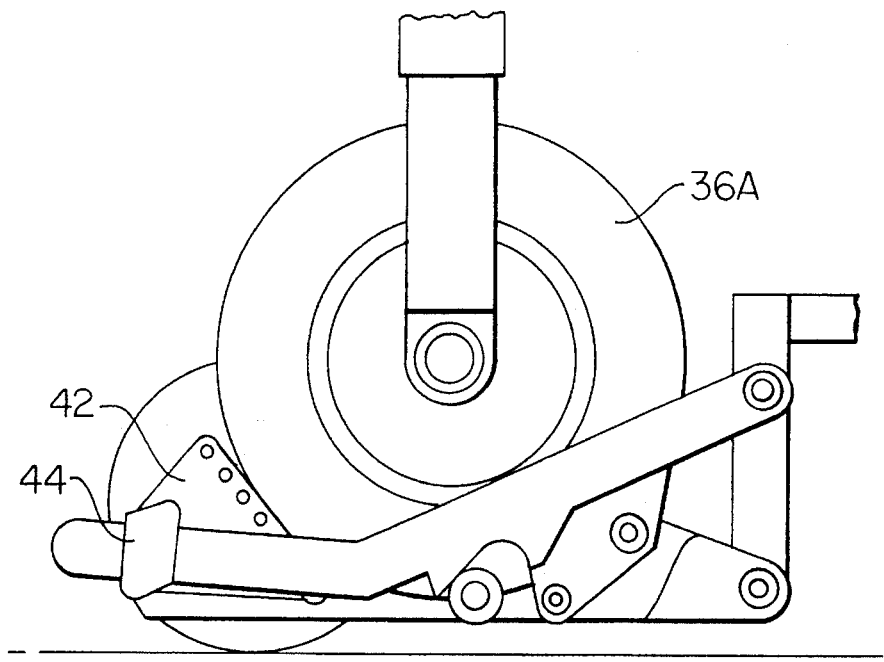

FIG. 10 shows a cut-away side view of the machine in the extended or raised position with the wheel support arms 24 supporting the nosewheel above the ground. The wheel is supported both by the removable wheel cradle and the fixed wheel cradle.

Figure 11:
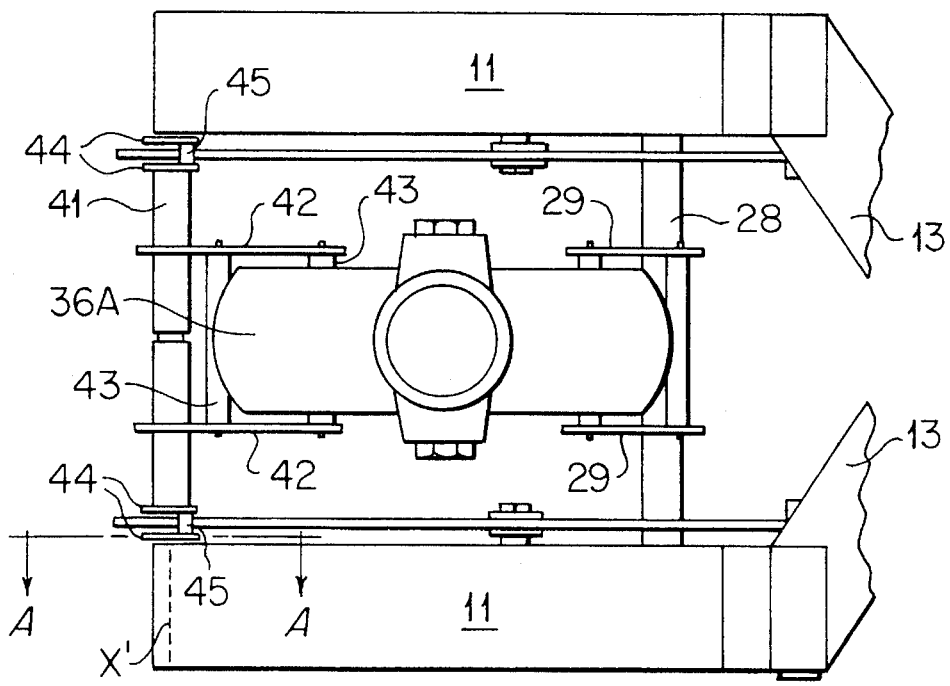
Figure 12:
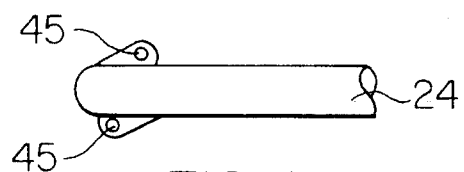
FIG. 12 is a cross-sectional view taken along line A—A of FIG. 11.

FIG. 11 shows a plan view of the nosewheel and bifurcated portion of the machine and FIG. 12 shows a section through A—A.

From the position of the dowels 45 in relation to the support arms 24, as shown in the section through A—A, it will be understood how a downward force acting on the removable wheel cradle is translated via the offset arrangement into a clockwise (as shown) moment about pivot point X', which is the axis of cross member 41, thereby locking the sleeves, between the dowels, to the support arms as long as the load is present.

I claim:

1. A self-propelled dolly for the movement of aircraft, the dolly comprising a chassis supported by wheel means carried on two longitudinally-spaced axles, the chassis including aircraft wheel support means between the axles, the wheel support means being movable between a lowered position for engagement and disengagement of an aircraft wheel and a raised position for supporting the aircraft wheel above the ground surface, at least one wheel means being motor-drivable, said wheel support means comprising a split first axle, a bifurcated chassis portion having two pairs of spaced apart parallel members defining therebetween a space to receive an aircraft wheel, a pair of laterally spaced apart first ground-engaging wheels each mounted about a portion of said split first axle in a respective pair of said parallel members, one or more second ground-engaging wheels mounted on a second chassis portion pivotally connected to the bifurcated chassis portion about a substantially vertical axis to provide steering ability to the dolly, the second chassis portion including handle means extending therefrom for control of the dolly by an operator, and a motor and drive means operatively connected to at least one of said ground-engaging wheels, the bifurcated chassis portion being formed in two sections pivotally connected together about a lateral pivot axis at an intermediate location between said first and second wheels, whereby said sections are lowerable and raisible at their mutually connected ends with respect to the ground, means to support an aircraft wheel being mounted on one of said sections and including releasable locking means to maintain said sections in the raised position, in which an aircraft with a wheel thereof supported above ground level by the dolly may be manoeuvered.

2. A dolly according to claim 1, in which the bifurcated chassis portion includes load-bearing elements which are disposed inboard of the parallel members, and the support means comprises fixed and movable wheel cradles mounted between the load-bearing elements and at least one of said parallel members of the bifurcated chassis portion.

3. A dolly according to claim 1, including a self-locking chock arrangement as part of the aircraft wheel support means.

4. A dolly according to claim 3, in which said wheel support means of the bifurcated chassis portion comprise forwardly-extending arms between which an aircraft wheel may be located, and a movable cradle engageable on the arms at any position therealong to accommodate wheels of various diameters, the cradle being lockable on the arms by the weight of the aircraft.

5. A dolly according to claim 4, in which the movable cradle comprises sleeve members which are slidable along the arms and are connected together by a lateral member carrying chock means, the sleeve members including upper and lower pins or dowels between which the arms are passed, whereby in an unloaded condition the sleeves may readily be slid along the arms until the chock means is adjacent the aircraft wheel but in a loaded condition the weight of the aircraft acting on the chock means causes the sleeve members to become firmly engaged on the arms.

6. A dolly according to claim 5, wherein the chock means is disposed longitudinally offset in relation to the lateral member, whereby downward force on the chock means imparts a turning moment to the lateral member which thus causes the upper and lower dowels of the sleeve members to grip the arms.

7. A dolly according to claim 1, in which the releasable locking means comprises bracing elements which extend between the respective sections of the bifurcated chassis portion.

8. A dolly according to claim 7, in which one of said sections comprises substantially horizontal members and the other of said sections comprises upstanding members, the lateral pivot axis between the sections being located at the rear ends of the horizontal members and the lower ends of the upstanding members, the bracing elements forming a triangular bracing structure between the horizontal and upstanding members.

* * * * *